United States Patent [19]

Rouyer et al.

[11] Patent Number: 5,257,491
[45] Date of Patent: Nov. 2, 1993

[54] METHOD OF PACKAGING AN ADHESIVE COMPOSITION AND CORRESPONDING PACKAGED ARTICLE

[76] Inventors: Alain Rouyer, Le Mesnil Fouque, Fresne-le-Plan, F-76520 Boos; Emmanuelle Pariente, 22 A, rue Malatire, F-76000 Rouen, both of France; Peter Yeboa-Kodie, Teilfeld 4, D-2120 Lüneburg, Fed. Rep. of Germany

[21] Appl. No.: 17,962

[22] Filed: Feb. 12, 1993

Related U.S. Application Data

[63] Continuation of Ser. No. 738,176, Jul. 30, 1991, abandoned.

[51] Int. Cl.⁵ .................... B65B 5/06; B65B 63/00
[52] U.S. Cl. .......................... 53/428; 53/436; 53/440; 53/443; 53/461; 53/473; 206/447
[58] Field of Search .................. 53/122, 428, 435, 436, 53/440, 443, 469, 473; 206/447, 524.1, 524.3, 524.4, 524.7

[56] References Cited

U.S. PATENT DOCUMENTS

| | | | |
|---|---|---|---|
| 2,287,849 | 6/1942 | Wilson | 206/447 X |
| 2,496,609 | 2/1950 | Antwerpen | 53/122 |
| 2,791,326 | 5/1957 | Sparks et al. | 206/524.7 |
| 2,931,148 | 4/1960 | Smith | 206/524.7 X |
| 3,827,778 | 9/1974 | Parker | 425/256 |
| 3,837,778 | 9/1974 | Parker | 206/524.7 |
| 3,851,438 | 12/1974 | Brisman | 53/440 X |
| 4,112,158 | 9/1978 | Creekmore et al. | 206/447 X |
| 4,306,657 | 12/1981 | Levy | 206/447 |
| 4,318,475 | 3/1982 | Robinson | 206/447 |
| 4,334,615 | 6/1982 | Butler et al. | 206/447 |
| 4,450,962 | 5/1984 | Matthews et al. | 53/440 X |
| 4,514,446 | 4/1985 | Kadono et al. | 206/447 X |
| 5,110,641 | 5/1992 | Kean | 428/35.5 |

FOREIGN PATENT DOCUMENTS

| | | |
|---|---|---|
| 2248046 | 4/1974 | Fed. Rep. of Germany . |
| 3234065 | 4/1983 | Fed. Rep. of Germany . |
| 3138222 | 5/1983 | Fed. Rep. of Germany . |
| 3625358 | 2/1988 | Fed. Rep. of Germany . |
| 0090324 | 8/1978 | Japan . |

*Primary Examiner*—John Sipos
*Assistant Examiner*—Linda B. Johnson
*Attorney, Agent, or Firm*—Merchant, Gould, Smith, Edell, Welter & Schmidt

[57] ABSTRACT

The invention relates to a method of packaging an adhesive composition, especially a thermoplastic or thermosetting hot melt adhesive. The method comprises the steps of providing one substantially uniform separate portion of the adhesive composition; sufficiently solidifying said portion for packaging; substantially completely surrounding said sufficiently solidified portion with a plastics packaging material. The packaging material being meltable together with the adhesive composition and blendable into said molten adhesive composition, the kind and amount of said packaging material being chosen so as not to disadvantageously affect the properties of the adhesive composition when blended into same. Preferably, the packaging material is a net, a wrap, a sack or a bag. Packagings made of plastic film are advantageously voided of air, to prevent problems in melting. The packaged adhesive can be melted as it is.

40 Claims, No Drawings

METHOD OF PACKAGING AN ADHESIVE COMPOSITION AND CORRESPONDING PACKAGED ARTICLE

This is a continuation, of application Ser. No. 07/738,176, filed Jul. 30, 1991, which was abandoned upon the filing hereof.

DESCRIPTION

The present invention relates to a method of packaging an adhesive composition, especially a thermoplastic or thermosetting hot melt adhesive, and further to packaged such adhesive compositions.

Thermoplastic adhesives, especially hot melts, can be confectioned and packaged as e.g. disclosed in German patent 22 48 046. According to this prior art now widely used throughout the world, a hot melt adhesive is squeeze-cut into roughly pillow-shaped pieces; the pieces are subsequently cooled and thus solidified and are then put into sacks, cartons and such like for packaging.

In order to reduce the tendency of the individual pillows to stick, i.e. adhere to each other, it is known to coat them with a separating, anti-stick substance, e.g. a wax or a polymer, compare also DE 33 27 289 Kaiser.

From WO 84/03457 and WO 84/03468, Societe Nouvelle Raffinerie Meridionale de Ceresines-Belix, it is known to outwardly coat such autoprotected blocks with a powdery separating agent.

For thermoplastic adhesive compositions with a relatively high softening point (ASTM E28-58T), i.e. above 120° C. and especially above 150° C., these coatings provide sufficient anti-stick properties. Such compositions can therefore be packaged, stored and dispensed from sacks, without any major sticking problems.

Another well-known packaging for adhesive compositions is to wrap or cast bigger portions of the adhesive in plastics film material, such as thick polyethylene film. These known packagings have the disadvantage that the thermoplastic adhesive composition must be removed from the packaging prior to use, which means an extra handling step. Further, the packaging material must be discarded after emptying, which leads to material waste and expenditure for disposing of the used packaging material.

A further problem arises with thermoplastic adhesive compositions, e.g. HMPSA's, having a relatively low softening point, i.e. below 120° C. and especially between 60° C. and 105° C. Such compositions show marked creep and cold flow properties even at ambient temperatures. Further, the expansion coefficients of these materials are sufficiently different from those of the coating materials as to lead to cracking and peeling of the coating materials, especially in prolonged storage at varying temperatures. Thus, the surfaces of the individual adhesive pillows or pieces become exposed and the pillows stick together, making the handling, especially the dosing of the adhesive more difficult and again leading to increased expenditure and handling problems. This is especially pertinent in cases where the adhesive composition is exposed to increased pressure and/or temperature during storage or handling.

From DE 31 38 222 and DE 32 34 065 it is already known to coat the circumference of elongated hot melt portions of between 1 and 1000 m length with a thin polyolefin film to prevent sticking problems when winding these string-like portions up onto themselves. The portions are subsequently cut to make cartridge of cartouche fillings, whereby the film stays on the circumference and is molten and applied together with the adhesive.

A similar proposal for extruding a hot melt adhesive into a tubular film is known from the lecture manuscript reprinted in "Kontinuierliche Aufbereitung von Haftklebstoffen", 5. Münchener Klebstoff- und Veredelungs-Seminar, 20. through 22. October 1980. The use of a co-extruded polyethylene film for manteling a long string of hot melt adhesive is further known from Swiss patent 431 177.

The above-mentioned prior art documents only relate to the concept of preventing individual hot melt portion pieces from sticking by individually coating them with a plastics material film. This is not suitable for mass-produced thermoplastic adhesive composition pillows, since it would be very expensive, it would lead to marked dilution of the adhesive with coating film material and it would further not be efficient, since in the squeeze-cutting step of adhesive composition pillow production, it would not be possible to produce a complete enclosure of the individual pillows by the film. Thus, relatively large areas of the pillow-shaped portion pieces would remain uncovered and the sticking problems would not be effectively overcome.

From German patent 36 25 358 to Hausdorf, it is known to completely wrap a single solid hot melt adhesive material block in a thermoplastic, especially a copolyamide film material with melting point between 120° C. and 150° C., to prevent sticking of the adhesive to the internal surfaces of a melting apparatus when pressure-melting the adhesive. The film material is melted and mixed with the adhesive. This prior art centers on copolyamide materials in view of their inherent hot melt adhesive properties.

Today, application temperatures of less than 150° C., preferably in the range of 110° C. to 140° C. are required by the end user to reduce thermal degradation problems of the adhesive as well as distortion of the substrates used. Therefore, for most applications, copolyamide films are not advantageous, in view of their high melting points and problems encountered in homogeneously melting and mixing such materials together with customary holt melt adhesives.

It is an important object of this invention to provide a method of packaging an adhesive composition, especially a thermoplastic or thermosetting hot melt adhesive, which reduces the amount of handling necessary in using the adhesive and also reduces or even eliminates packaging waste.

It is another important object of this invention to provide a method of packaging an adhesive composition, especially a thermoplastic or thermosetting hot melt adhesive, which permits the packaging of low softening point adhesives, such as HMPSA's and sprayable hot melts, without the sticking and blocking problems encountered in prior art.

To attain these and other objects and advantages, a method of packaging an adhesive composition, especially a thermoplastic or thermosetting hot melt adhesive according to the present invention comprises the steps of providing one substantially uniform separate portion of the adhesive composition; sufficiently solidifying said portion for packaging; substantially completely surrounding said sufficiently solidified portion with a plastics packaging material; said packaging material being meltable together with the adhesive composition and blendable into said molten adhesive composition, the kind and amount of said packaging material being chosen so as not to disadvantageously affect the properties of the adhesive composition when blended into same.

This method is especially suited for the packaging of relatively large portion pieces of the adhesive, such as individual pieces weighing between 100 grams and 4 kilograms.

In another aspect of the present invention, a method of packaging an adhesive composition, especially a thermoplastic or thermosetting hot melt adhesive, comprises the steps of providing a plurality of substantially uniform separate portions of the adhesive composition; sufficiently solidifying all said portions for packaging; forming a batch comprising the plurality of solidified portions, and substantially completely surrounding said batch with a plastics film packaging material or a net or similar apertured enclosure made of plastics; said packaging material being meltable together with the adhesive composition and blendable into said molten adhesive composition, the kind and amount of said packaging material being chosen so as not to disadvantageously affect the properties of the adhesive composition when blended into same.

This method is especially advantageous for the packaging of pillow-shaped pieces of low softening point thermoplastic adhesives as described above.

The further independent claims and subclaims as appended hereto define and describe other advantageous aspects and preferred embodiments of the present invention.

Packaging single, larger portions or batches of smaller portion pieces of the adhesive composition into sacks or bags of the plastics film packaging material according to this invention, or even wrapping suitable portions of adhesive in such packaging materials, makes it possible for the user to feed the complete packaged article, i.e. the adhesive and the packaging material surrounding it, into the melter. The packaging material is then molten together with the adhesive composition and is blended into the composition. In view of the minor amounts of packaging material required, and the suitable choice of packaging material, especially with respect to its melting point and compatibility with the adhesive composition, the properties of the adhesive composition are not disadvantageously affected by the additional matter.

Thus, it is neither necessary to unpack the adhesive composition prior to melting and subsequent use, nor is it necessary to dispose of the packaging material in a separate step.

Larger portions of adhesive composition can be individually wrapped or bagged in the plastics film packaging material, irrespective of their softening point.

For adhesives that do not block easily, an apertured enclosure such as a net can be used.

In the packaging of adhesive compositions, especially sprayable hot melt adhesives and HMPSA's it is advantageous to employ a further, more specific aspect of the present invention. It has been shown in corresponding tests that plastics film sacks containing larger batches of portion pieces, e.g. pillows of adhesives can cause problems in melting. In some cases, the film forming the sack does not melt and blend uniformly into the molten adhesive instead floating on the surface of the melt and/or adhering to the melter walls, which can cause major problems. Without wanting to restrict the invention by any theoretical explanation, it is presently assumed that this inhomogeneous, non-uniform melting performance is due to the air enclosed in a plastics film material sack loosely filled with adhesive composition portion pieces, such as pillow-shaped pieces, respectively the missing mutual contact between film material and adhesive composition pieces.

In such cases, it is possible to overcome the homogeneity problem by using another aspect of the present invention, according to which a batch, comprising a plurality of separate adhesive composition portion pieces, is placed in a bag of plastics film packaging material, said bag being subsequently sealed by welding or another suitable method, and said bag being voided of air. This is preferably done by compressing or evacuating the bag at elevated temperatures, e.g. in a press or simply by storing stacked filled bags at temperatures of 30° C. to 150° C. The various thin plastic films (usually 15 um to 100 um thickness) used in this invention can easily be perforated, so that no further steps need be taken to permit the escape of air in the compression step. Additionally, the air can leave the bag through openings in the weld seams, which are usually not 100% air-tight. It is even possible that air may leave the bag through pores in the film material.

In any case, the adhesive pillows are compressed and compacted at the elevated temperatures mentioned, which entails a degree of deformation of the portion pieces or pillows; at the same time, the packaging plastics film material is forced into close contact with the adjoining adhesive material, and is in most cases adhered to the adhesive.

This proved to be very advantageous upon subsequent cooling and storage as well as handling of the finished adhesive packs. Since the film sticks to the adhesive in the package, it is not easily damaged and even if punctured or slit, the adhesive remains covered by the packaging material.

Thus, adhesive packaged according to the invention can be stored, handled and used without any problems of the individual packs sticking together or adhering to other objects, even if exposed to increased pressure and/or temperature and even when low softening point adhesives are packaged.

Of course, also such low softening point adhesive packages can be molten with the packaging material blending into the adhesive, thus realizing the already mentioned advantages with respect to expenditure.

A plurality of plastics net or film materials can be used according to this invention. These materials can be selected from the groups comprising ethylene based polymers such as ethylene/vinyl acetate, ethylene acrylate, ethylene methacrylate, ethylene methyl acrylate, ethylene methyl methacrylate, high and low density polyethylene, polyethylene blends and chemically modified polyethylene, copolymers of ethylene and 1-6 mono- or di-unsaturated monomers, polyamides, polybutadiene rubber, polyesters such as polyethylene terephthalate, polybutylene terephthalate; thermoplastic polycarbonates, atactic poly-alpha-olefins, including atactic polypropylene, and others; thermoplastic polyacrylamides, polyacrylonitrile, copolymers of acrylonitrile and other monomers such as butadiene styrene; polymethyl pentene, polyphenylene sulfide, aromatic polyurethanes; styrene-acrylonitrile, acrylonitrile-butadiene-styrene, styrene-butadiene rubbers, polyethylene terephthalate, acrylonitrile-butadiene-styrene elastomers, polyphenlene sulfide, A—B, A—B—A, A—(B—A)$_n$—B, (A—B)$_n$—Y block copolymers wherein the A comprises a polyvinyl aromatic block, the B block comprises a rubbery midblock which can be partly hydrogenated, and mixtures of said substances, but other similar materials can be used as well, to match the properties of the adhesive packaged. Specific examples include polyethylene films of between 5 μm and 200 μm, preferably between 15 μm and 50 μm thickness, depending on available dispensing equipment; such films being especially useful for packaging low softening point adhesive composition pillows batchwise into, say, 1000 gram bags with subsequent compression to remove air.

Another suitable plastics film material is ethylene vinylacetate copolymer, with a vinylacetate content of between 10% and 33%, especially between 14% and 18% and a softening point between 80° C. and 100° C.

In any case, it is advantageous to restrict the amount of packaging material used to between 0.1 and 3% by weight with respect to the weight of the adhesive composition contained in the package. This prevents undue dilution and corresponding modification of the adhesives characteristics.

It is further advantageous to suit the softening point of the packaging material to that of the adhesive composition. Packaging materials having softening temperature ranges rather than sharp melting points are less advantageous, since their melting performance is less predictable and can give rise to problems of homogeneity in the molten adhesive/packaging material blend.

Generally, packaging materials with melting or softening points below 125° C., preferably below 120° C. and often above 90° C. are useful in the context of this invention.

The envelope containing the discrete adhesive units is made of a material that when blended into the adhesive does at least not substantially negatively influence adhesive characteristics, and preferably is either a component of the adhesive or is a component physically and chemically compatible with the adhesive in the melt prior to application. The polymer should not cause a physical phasing or separation of the adhesive, should not reduce adhesive properties and should not chemically react with any adhesive component. Further, the envelope material could be selected to cooperate with the components of the adhesive unit to enhance a desired property including, but not limited to, adhesive strength, pressure-sensitive properties, wet-out properties, cohesive strength, peel strength, shear strength, oil bleed, rate of cure, etc. A large number of thermoplastic film forming polymers that can be used in hot melt adhesives, can be used in manufacturing the uniquely packaged adhesive of the invention.

Hot Melt Adhesive Systems

Hot melt adhesive systems can apply adhesive through nozzles as small as 0.012 to 0.025 inches.

Briefly, thermoplastic synthetic resin materials used in hot melt adhesives comprise a variety of polymerized material. These polymers are blended with other ingredients such as plasticizer, tackifier and extender, to form an adhesive. Such polymers include polyethylene, polypropylene, polyvinyl acetate, polyvinyl butyral, polyvinylalcohol, ethylene-vinylalcohol polymers and other polyvinyl resins; polystyrene resins, A—B—A block copolymers comprising polymers wherein A is a polystyrene block and B is a rubbery midblock section; acrylic and methacrylic acid ester resins; various other materials compounded from synthetic resins such as polyisobutylene, polyamides, cumarone-indene products and silicones. Such thermoplastic resins usually have permanent solubility and fusability so that when hot, they can flow or creep under stress and soften to some extent to form a bond. After cooling, the materials preferably resist creep and bond deformation. They are used in the manufacture of tape, safety glass, shoe cements, for the bonding or lamination of film, foil or non-woven laminates, metals, woods, rubber, paper and many other materials.

Briefly, thermosetting resin adhesives comprise a variety of phenol-aldehyde, urea-aldehyde, melaminiealdehyde, and other condensation polymerization materials including polyepoxy, polyurethane and silicone resins. Thermosetting resins are characterized by being converted to insoluble and infusible materials, sometimes by means of either heat or catalytic action. Thermosetting adhesive compositions include epoxies, urethanes, silicones, phenolics, resorcinol, urea, melamine, formaldehyde, phenol-furfuraldehyde, and the like and are used for the bonding of wood textiles, paper, plastics, rubber, automative, and appliance assembly and many other end uses.

Briefly, the adhesives of the natural and bitumen group consist of those made from asphalt, shellac, rosin and its esters, and similar materials. They are typically used for bonding of various materials including minerals, linoleum and the like.

Thermoplastic Polymers

The thermoplastic base polymer that can be used in the manufacture of the novel adhesive of the invention are thermoplastic polymers that are sufficiently compatible with tackifier, plasticizer, and other thermoplastic or thermosetting components to form a substantial homogenous melt and solid. Typically in the adhesives of the invention, after the application and the development of maximum modulus, the polymer provides mechanical strength and a cohesively competent adhesive bonding mass.

Any of a variety of available thermoplastic materials can be used in the compositions of the invention. Examples of such thermoplastics are ethylene based polymers such as polyethylene and its co- and terpolymers, ethylene/vinyl acetate, ethylene acrylate, ethylene methacrylate, ethylene methyl acrylate, ethylene methyl methacrylate, copolymers of ethylene and 1-6 mono- or di-unsaturated monomers etc., polyamides, polybutadiene rubber, polyesters such as polyethylene terephthalate, polybutylene terephthalate, etc., thermoplastic polycarbonates, atactic poly-alpha-olefins, including atactic polypropylene, and others; thermoplastic polyacrylamides, polyacrylonitrile, copolymers of acrylonitrile and other monomers such as butadiene, styrene, etc., polymethyl pentene, polyphenylene sulfide, aromatic polyurethanes; styrene-acrylonitrile, acrylonitrile-butadiene-styrene, styrene-butadiene rubbers, polyethylene terephthalate, acrylonitrile-butadiene-styrene elastomers, polyphenylene sulfide. Also, A—B, A—B—A, A—(B—A)$_n$—B, (A—B)$_n$—Y block copolymers wherein the A comprises a polyvinyl aromatic block, the B block comprises a rubbery midblock which can be partly hydrogenated, and others can be used. The aromatic character of the polymers provides compatibility with the aromatic plasticizing agents discussed below and provides controlled compatibility with the tackifier or the tackifier blends used to control modulus in the adhesive compositions. The preferred polymers should have a molecular weight sufficient that, when used in an adhesive formulation, the adhesive can maintain a high cohesive strength.

Water soluble thermoplastics such as polyethyloxazoline, polyvinyl pyrrolidone etc., can be used in the pillow adhesive unit.

Preferred polymers for use in the adhesives of this invention comprise EVA, APP, linear A—B—A block, linear A—(B—A)$_n$—B multiblock copolymers, and radial or teleblock copolymers of the formula (A—B)-$_n$—Y wherein A comprises a polystyrene block, B comprises a substantially rubbery polybutadiene or polyisoprene block, Y comprises a multivalent compound, and n is an integer of at least 3. The midblocks can be post-treated to improve their heat stability through hydrogenation or other post-treatment removing residual unsaturation. We believe that the size and the amount of the A or end blocks in the A—B—A block of copolymer structure should be as much as 15–51 wt-% of the polymer.

While the total styrene content of the polymers can be as much as 51 wt-% of the polymer, and since the polymers can have more than two A blocks for optional performance, the largest A block should be less than or equal to about 20 wt-% of the polymers, and, most preferably, is less than or equal to 15 wt-% of the polymer. In an S-B-S (styrene-butadiene-styrene) copolymer, the preferred molecular weight is about 50,000 to 120,000, and the preferred styrene content is about 20 to 35 wt-%. In an S-I-S (styrene-isoprene-styrene) copolymer, the preferred molecular weight is about 100,000 to 150,000 and the preferred styrene content is about 14–30 wt-%. Hydrogenating the butadiene midblocks produces rubbery midblocks that are typically considered to be ethylene-butylene midblocks.

Such block copolymers are available from Shell Chemical Company, Enichem, Fina and Dexco. Multi-block or tapered block copolymers (the A—(B—A)-$_n$—B type) are available from Firestone under the STEREON 840A and 845 trademarks.

Another usable polymer is available under the trade name TUFPRENE A from Asahi, Japan.

The adhesive compositions of the invention can contain other compatible polymers, fillers, pigments, dyes, oils, catalysts, inhibitors, antioxidants, UV absorbers, waxes, and other conventional additives.

Tackifying Resin

The adhesives of the invention can contain a tackifying resin in combination with a thermoplastic block copolymer optionally with a plasticizer or other components.

Tackifying resins useful in the adhesives of the invention comprise rosin derivatives including wood rosin, tall oil, tall oil derivatives, rosin ester resins, natural and synthetic terpenes and aliphatic aromatic or mixed aliphatic-aromatic tackifying resins. Aromatic monomers useful in forming the aromatic containing resin compositions of this invention can be prepared from any monomer containing substantial aromatic qualities and a polymerizable unsaturated group. Typical examples of such aromatic monomers include the styrenic monomers, styrene, alphamethyl styrene, vinyl toluene, methoxy styrene, tertiary butyl styrene, chlorostyrene, etc., indene monomers including indene, methyl indene and others. Aliphatic monomers are typical natural and synthetic terpenes which contain $C_6$ and $C_5$ cyclohexyl or cyclopentyl saturated groups that can additionally contain a variety of substantial aromatic ring substituents. Aliphatic tackifying resins can be made by polymerizing a feed stream containing sufficient aliphatic monomers such that the resulting resin exhibits aliphatic characteristics. Such feed streams can contain other aliphatic unsaturated monomers such as 1,3-butadiene, cis-1,3-pentadiene, trans-1,3-pentadiene, 2-methyl-1,3-butadiene, 2-methyl-2-butene, cyclopentadiene, dicyclopentadiene, terpene monomers and others. Mixed aliphatic aromatic resins contain sufficient aromatic monomers and sufficient aliphatic monomers and optionally other $C_3$-$C_8$ unsaturated monomers to produce a resin having both aliphatic and aromatic character. The article by Davis, *The Chemistry of $C_5$ Resins*, discusses synthetic $C_5$ resin technology.

Representative examples of such aliphatic resins include hydrogenated synthetic $C_9$ resins, synthetic branched and unbranched $C_5$ resins and mixtures thereof. Representative examples of such aromatic tackifying resins include styrenated terpene resins, styrenated $C_5$ resins or mixtures thereof. The selection of tackifying resins is often based on the nature of the B or midblock radial block copolymer. Rosin derivatives are best for S-I-S/S-B-S blends and can be used with either S-I-S or S-B-S alone. Hydrogenated $C_9$ or straight aliphatic resins are preferred for S-I-S copolymers. For S-B-S copolymers, styrenated terpenes or rosin esters are preferred.

The adhesive compositions of the invention can contain rosin and rosin derivatives as a tackifying agent. Rosin is a solid material that occurs naturally in the oleo rosin of pine trees and typically is derived from the oleo resinous exudate of the living tree, from aged stumps and from tall oil produced as a by-product of kraft paper manufacture. After it is obtained rosin can be treated by hydrogenation, dehydrogenation, polymerization, esterification, and other post treatment processes. Rosin is typically classed as a gum rosin, a wood rosin, or as a tall oil rosin which indicates its source. The materials can be used unmodified, in the form of esters of polyhydric alcohols, and can be polymerized through the inherent unsaturation of the molecules. Materials are commercially available and can be blended into the adhesive compositions using standard blending techniques. Representative examples of such rosin derivatives include pentaerythritol esters of tall oil, gum rosin, wood rosin, or mixtures thereof.

Specific examples of useful tackifying resins that can be compatible with a variety of the thermoplastic resins or thermosetting resins used in the adhesives of the invention include materials such as natural and modified rosins, glycerol, and pentaerythritol esters of natural and modified rosins, copolymers and terpolymers of natural terpenes, polyterpene resins having a softening point as determined by ASTM method E28-58 T, of from about 80° C. to 150° C., phenolic modified terpene resins and hydrogenated derivatives thereof; aliphatic petroleum hydrocarbon resins having a ring and ball softening point of from about 70° C. to 135° C., aromatic petroleum hydrocarbon resins and hydrogenated derivatives thereof and alicyclic petroleum hydrocarbon resins and the hydrogenated derivatives thereof.

Plasticizers

A plasticizer is broadly defined as a typically organic composition that can be added to thermoplastics, rubbers and other resins to improve extrudability, flexibility, workability, or stretchability. Typical plasticizers in adhesives are plasticizing oils that are liquid at typical ambient temperature. The plasticizer used in the adhesives of the invention can also be typically a solid composition at ambient temperature having a softening point of at least 45° C. Preferably, the solid plasticizer if used is a composition with a softening point of at least 60° C. Increased softening points (60°-130° C.) can aid in improving heat resistance or preventing bond failure at high temperatures.

Plasticizing oils are used in the construction/elastic attachment/pressure sensitive adhesives of the invention. Such oils are primarily hydrocarbon oils low in aromatic content. Preferably the oils are paraffinic or naphathenic in character. The oils are preferably low in volatility, are clear and have as little color and odor as possible. The use of a plasticizing oil of this invention also contemplates the use of olefin oligomers, low molecular weight polymers, vegetable oils and their derivatives and similar plasticizing liquids.

One useful class of plasticizers used in the invention comprises a cyclo-aliphatic or aromatic ester of a benzene dicarboxylic acid. Such plasticizers are prepared by forming an ester from a cyclo-aliphatic or aromatic alcohol such as cyclohexanol, phenol, naphthol, or other monohydroxy alcohol compounds having from 5 to 12 carbon atoms. The ester compounds are formed from dicarboxylic acid compounds, typically phthalic acids. Phthalic acids that can be used in the plasticizers are 1,2-benzene dicarboxylic acid, 1,3-benzene dicarboxylic acid (isophthalic acid), or 1,4-benzene dicarboxylic acid (terephthalic acid). The preferred plasticizers of this class comprise dicyclohexyl phthalate or diphenyl phthalate. Most preferably, dicyclohexyl orthophthalate is used.

A second class of useful plasticizers comprise an aromatic carboxylic acid ester of a polyfunctional alcohol having 1 to 10 hydroxyl groups. Polyfunctional alcohols that can be used in the compositions of this class of plasticizers include compounds having at least two hydroxyl groups and at least two carbon atoms in the molecule. Specific examples of preferred hydroxy compounds include ethylene glycol, propylene glycol, 1,2-butylene glycol, 1,4-butylene glycol, glycerine, glucose, fructose, sucrose, mannitol, trimethylol ethane, 1,4-cyclohexane dimethanol, pentaerythritol, 2,2-dimethyl-1,3-propane diol, 2-hydroxy methyl-2-methyl-1,3-propane diol, neopentyl glycol, and other useful polyfunctional hydroxyl compounds. Aromatic acids that can be used with the polyfunctional alcohols to form this class ester plasticizer compounds of the invention include aromatic carboxylic acids, typically having at least one aromatic group and at least one carboxyl function. Representative acids include bezoic acid, naphthanoic acid, and 4-methyl benzoic acid. Typical examples of such useful plasticizers include triethylene glycol tribenzoate, trimethylol ethane tribenzoate, glycerol tribenzoate, sucrose benzoate, pentaerythritol tetrabenzoate, 2,2-dimethyl-1,3-propane diol dibenzoate, triethylene glycol dibenzoate, glycerol tribenzoate, 2-hydroxymethyl-2-methyl-1,3-propane diol tribenzoate, pentaerythrithol tetrabenzoate, neopentyl glycol dibenzoate, mixtures thereof and others.

A preferred plasticizer is a solid with a softening point above 60° C. which belongs to the class of plasticizers including cyclohexane dimethanol dibenzoate compounds. A 1,4-cyclohexane dimethanol dibenzoate (containing cis- and trans- isomers) is exemplified and produces the maximum control over variation and change in adhesive physical properties.

A third class of useful plasticizers for use in the invention comprise a sulfonamide class made from aromatic sulfonic acids. Such plasticizers generally fall within the structural formula:

$$R-Ar-SO_2-NR_2$$

wherein each R is independently selected from the group consisting of hydrogen, aliphatic and cyclo-aliphatic radicals having 1 to 12 carbon atoms. Each R can be typically hydrogen, methyl, ethyl, propyl, isopropyl, n-butyl, isobutyl, tertiary butyl, ethyl hexyl, neopentyl, cyclohexyl, deodecyl etc. R is preferably methyl, ethyl or cyclohexyl. Such sulfonamide plasticizers can also be used in the form of a resinous material formed through the condensation of formaldehyde with said sulfonamide plasticizer.

Specific examples of adhesive materials that can be used to prepare the pillows which are stored in the film envelopes of the invention are as follows:

TABLE I

| | Typical Adhesive Formulations | | | | |
|---|---|---|---|---|---|
| Ingredient | Water Resealable HM-PSA | Moisture Activated Adhesive | Book Binding Adhesive | Repulpable Hot Melt Adhesive | Contact Lens Mounting Adhesive |
| Polyalkylenimine | 20–45 | 30–55 | 15–60 | 30–55 | 15–50 |
| Tackifying Agent | 15–40 | 2–15 | — | 2–50 | — |
| Plasticizer+ | — | 0–20+ | 10–30 | 15–40 | — |
| Wax (hydroxy) | — | 10–35 | 10–40 | 5–40 | 5–60 |
| Filler | 25–40 | — | — | 0–35 | — |
| Plasticizer (Hydroxy Compound) | | | | | |

+Preferably having an agreeable taste or no taste.

The above table sets forth examples of fully functional water activated adhesives made using a polyethyloxazoline thermoplastic resin. The fully formulated adhesives made with a polyethyloxazoline resin are water dispersible or water soluble. Accordingly, a water insoluble thermoplastic resin is typically used as an envelope material. Such adhesives can be selected from a variety of adhesives, however, we have found that small amounts of A—B—A block copolymer are useful in the polyethyloxazoline adhesives to increase cohesion and bond strength. However, any water insoluble film compatible with the polyethyloxazoline can be used in such an application.

We have found the A—B—A block copolymer, A—B—A—B—A—B multiblock copolymer and radical block copolymer thermoplastic resins can be used in a variety of useful adhesives. Such adhesives are disclosed in Collins, U.S. Pat. No. 4,136,699 which teaches a particular blend of A—B—A copolymer terpene or synthetic terpene tackifying resin and oil for use in the preparation of disposable articles. In addition, the following adhesives can be useful in the invention:

TABLE II

Low Polymer Resin Compositions

|  | Useful | Preferred | Most Preferred |
|---|---|---|---|
| Solid Plasticizer | 5–75 | 10–60 | 40–50 |
| Tackifier | 25–95 | 30–90 | 35–65 |
| Polymer | 0–15 | 0–12 | 0.1–10 |

TABLE III

Higher Polymer Resin Compositions

|  | Useful | Preferred | Most Preferred |
|---|---|---|---|
| Solid Plasticizer | 5–70 | 10–50 | 20–30 |
| Tackifier | 20–85 | 30–75 | 35–60 |
| Polymer | 10–55 | 12–35 | 15–30 |

TABLE IV

|  | Useful | Preferred | Most Preferred |
|---|---|---|---|
| Radial block copolymer* | 5–14 | 7–13 | 8–12 |
| A-B-A block copolymer* | 0–14 | 0–12 | 0–10 |
| Tackifier | 45–85 | 50–80 | 55–75 |
| Plasticizing Oil | 5–35 | 6–30 | 8–20 |
| Synthetic polythylene wax (or other oil complexing agent) | 0–10 | 0.1–9 | 0.25–5 |

*Total polymer content (including both radial block and linear block polymer) is typically about 15 wt-% or less of the adhesive.

Such hot melt adhesive materials based on A—B—A or other types of block copolymers can be made into pillows and can be packaged in envelopes or containers made from the A—B—A or other block copolymer technology. Since the envelope will comprise from about 0.1 to about 5 wt-% of the total adhesive mass, the amount of block copolymer used in formulating the adhesive pillow can be reduced and can be added to the melt in the form of the film enclosure.

One part and two part polyurethane adhesive materials can be used in preparation of the adhesives of the invention. Such materials are disclosed in U.S. Pat. No. 4,412,033 and 4,390,678 found in the table set forth below.

Such adhesives rely on the reactivity between a polyol and a urethane prepolymer wherein the isocyanate groups condense with hydroxyl groups and prepolymer. Other types of urethane materials including hydrocuring or moisture curing urethane adhesives can be used in the invention. Additionally, two part urethane adhesives wherein the isocyanate material is formulated and manufactured in separate pillows from the polyol material can be made.

Additionally, one part urethane adhesives having substantial proportions of thermoplastic polymers can be used in the adhesives of the invention. Such adhesives are disclosed in the following tables.

TABLE V

|  | Typical Adhesive Parts by Weight | Preferred Adhesive Parts by Weight | Most Preferred Adhesive Parts by Weight |
|---|---|---|---|
| Thermoplastic Polymer | 1–200 | 20–175 | 20–150 |
| Isocyanate Terminated Prepolymer | 100 | 100 | 100 |
| Tackifying Resin | 1–200 | 20–200 | 40–135 |

When using these one part adhesives, the thermoplastic material from the adhesive can be used to form the packaging film (provided water vapour permeability of the packaging material is sufficiently small), with an equal reduction in the percentage of the thermoplastic and the pillow. The urethane materials set forth above free of thermoplastic polymer can be packaged in any compatible resin.

Container or Envelope Film

Any of a wide variety of thermoplastic materials can be used as the envelope or container material for the nets or the films enclosing the adhesive. Examples of such thermoplastics are ethylene based polymers such as ethylene/vinyl acetate, ethylene acrylate, ethylene methacrylate, ethylene methyl acrylate, ethylene methyl methacrylate, high and low density polyethylene, polyethylene blends and chemically modified polyethylene, copolymers of ethylene and 1-6 mono- or di-unsaturated monomers, polyamides, polybutadiene rubber, polyesters such as polyethylene terephthalate, polybutylene terephthalate, etc., thermoplastic polycarbonates, atactic poly-alpha-olefins, including atactic polypropylene, and others; thermoplastic polyacrylamides, polyacrylonitrile, copolymers of acrylonitrile and other monomers such as butadiene, styrene, etc., polymethyl pentene, polyphenylene sulfide, aromatic polyurethanes; styrene-acrylonitrile, acrylonitrile-butadiene-styrene, styrene-butadiene rubbers, polyethylene terephthalate, acrylonitrile-butadiene-styrene elastomers, polyphenylene sulfide. Also, A—B, A—B—A, A—(B—A)$_n$—B, (A—B)$_n$—Y block copolymers wherein the A comprises a polyvinyl aromatic block, the B block comprises a rubbery midblock, and others can be used.

The manufacture of such films from thermoplastic materials is well-known. Such films can range in thickness from about 5 µm to 200 µm, preferably from 15 µm to 50 µm for reasons of mechanical strength and product integrity.

Such films often contain additional amounts of plasticizers, stabilizers, dyes, perfumes, fillers and other materials to increase the flexibility, handleability, visibility or other useful property of the film.

The melting point or softening point of the film material will be chosen in view of that of the adhesive to be packaged. Generally, this melting or softening point will nevertheless be below 125° C., preferably below 120° C. and often above 90° C.

The film material can be packaged in a second outer container or envelope for a variety of purposes including reducing the exposure of the film to moisture, or other contaminants, to increase the handleability of the adhesive and envelope, to provide a surface for labelling. Such envelopes would be conformed for easy opening with pull tabs, perforations, or other means well-known in the art.

In the practice of the present invention, the adhesive composition, e.g. a hot melt adhesive, is prepared by mixing polymer, synthetic or natural resin, wax or paraffin and other substances as desired and well-known in the art, this mixing or blending being carried out at elevated temperatures and by customary methods.

The adhesive composition is then pumped to an orifice for dispensing. Usually, a coating with a separating anti-stick substance will be provided, and the coated composition will be pre-cooled prior to dispensing.

In a preferred embodiment of this invention, the dispensed composition is squeeze-cut, and thus separated into individual, pillow-shaped portion pieces. At this stage, the composition is already partly solidified, i.e. the individual pieces are sufficiently solidified at their outside, to be squeeze-cut and retain their pillow-like shape afterwards, although the interior of the pillows may still be fairly hot and liquid.

The pillows are thereafter placed in a cooling bath, usually with water as the cooling liquid and are sufficiently solidified for packaging. At this stage, the heat remaining in the pillows can be adjusted by suitable choice of cooling time, to keep the pillows warm enough for deformation in a subsequent compression step.

The sufficiently solidified pillows are now conveyed to a packaging station, e.g. a bagging machine and are placed into nets or bags of plastics film packaging material according to this invention. For packaging the customary coated hot melt pillows, it is presently preferred to produce bags from a tubular film of polyethylene or EVA co- or terpolymer material with 15 $\mu$m to 50 $\mu$m thickness, each bag taking about 1000 gram of pillows, although other plastics materials are also suitable.

Each filled bag is then sealed by a weld seam. At this stage, the bag contains a fairly loose filling of relatively stiff pillows and a corresponding amount of air.

In order to reduce the initially mentioned problems in subsequent use of low softening point adhesive composition pillows packaged according to this invention, the bag is now either put in a press and compressed as well as compacted at elevated pressure and temperature, or it is simply stacked with other, similar bags under sufficient heat, so that the compression is effected by the weight of the stack. In the latter case, the heat can be provided by either placing the stacks in a correspondingly heated room or by allowing the pillows to retain sufficient internal heat in the cooling process, this heat then re-softening the solidified outer regions of each pillow after the packaging.

In another preferred embodiment, the hot melt adhesive will be extruded from an extruder provided with suitable cooling means, the adhesive having a temperature of between about 50° C. and 100° C., preferably about 80° C. upon extrusion. The adhesive is extruded directly into a bag or sack of the film material according to the invention. The adhesive can be cut or otherwise comminuted after extrusion and before packaging, but preferably, the adhesive is extruded into the packaging bag or sack without such comminution, until the desired amount of adhesive is received in the package. At this stage, the extruded adhesive is cut off, the package is sealed and a new bag or sack is connected to the extruder for filling.

In this embodiment, the extrusion temperature of the adhesive provides sufficient plasticity and shapability of the adhesive for substantially uniformly filling the package, without leaving undesirable voids or damaging the bag or sack in the filling or packaging process.

Preferred embodiments of the invention will now be described in more detail, by reference to the following examples.

EXAMPLE 1

Pillows of an EVA-based commercially available HMPSA were placed in a bag, the bag taking 500 gram of hot melt, and the packaging material forming 0.25 weight % of the total package.

The bag was made of a plastics material film of 16 $\mu$m thickness, the plastics being a modified ethylene vinylacetate copolymer with 17% vinylacetate and a melting point of 94° C.

As a comparison, unpackaged pillows of said adhesive were used.

Both the packaged and the non-packaged hot melt samples were then molten; the following table shows the properties of the adhesives thus obtained:

TABLE VI

| Brookfield viscosity (mPa · s) at 20 rounds per minute | Non-packaged adhesive | Packaged adhesive |
|---|---|---|
| at 120° C. | 17 750 | 18 000 |
| at 130° C. | 11 750 | 11 875 |
| at 140° C. | 8 000 | 7 750 |
| at 150° C. | 5 000 | 5 125 |
| at 160° C. | 3 625 | 3 625 |
| at 170° C. | 2 625 | 2 700 |
| at 180° C. | 1 940 | 2 000 |

The softening point, determined in accordance with the method described in ASTM E 28 (Bille and Anneau) was 73° C. for the non-packaged hot melt and 74° C. for the blend of hot melt and packaging material.

At 25° C., the penetration according to DIN 51579 was 47 for the non-packaged adhesive and 46 for the blend.

Within the experimental error margins, the properties of the adhesive thus remain unaffected by the blending in of the packaging material in the melting stage.

In another experiment, both above-mentioned adhesive samples were coated onto a polyester substrate, the adhesion properties in terms of peeling and shearing being then determined by adhering the substrate onto different materials.

The following results were obtained:

TABLE VII

|  | Non-packaged adhesive | Packaged adhesive |
|---|---|---|
| Shearing on cotton | 1,46 N | 1,31 N |
| Peeling at 23° C.: |  |  |
| on cotton | 0,03 N | 0,03 N |
| on nylon | 0,27 N | 0,23 N |
| on silk | 0,27 N | 0,25 N |
| Peeling at 38° C.: |  |  |
| on cotton | 0,62 N | 0,66 N |
| on nylon | 2,02 N | 1,92 N |
| on silk | 2,76 N | 2,77 N |
| Peeling at 30° C. on cotton: AFNOR norm) |  |  |
| t = 0 minutes | 2,37 N | 2,68 N |
| T = 15 minutes | 2,05 N | 2,68 N |

Again, the experimental error is larger than the differences of properties detected, so that it can be stated that the adhesives show identical performance irrespective of the blending in of the packaging material in the melting step.

EXAMPLE 2

An EVA film of 100 μm thickness and DSC softening point 108.2° C. was used to package
a) EVA based adhesive pillows
b) APP based adhesive pillows into bags, following the general procedure as in Example 1.

The adhesive-filled bags were placed in a melter/dispenser apparatus and melted and applied at 140° C. No influence of the packaging material component in the adhesive material was notable in the final product.

EXAMPLE 3

An EVA film of 50 μm thickness (vinyl acetate content 18%) and DSC softening point 84.3° C. was used to package
a) SB rubber (Tufprene A) based adhesive blocks by wrapping
b) APP based adhesive pillows and
c) SBS rubber based adhesive pillows, both by bagging as in Example 1.

In melting and application of the packaged adhesives a) at 150° C. and b) at 140° C., no influence of the packaging material was again detectable. When adhesive c) was melted and applied at 120° C. with air still contained in the bags, inhomogeneity of the melt was observed. This problem could be overcome by evacuation of the bags.

EXAMPLE 4

A PE film of 30 μm thickness and DSC softening point 106° C. was used to package
a) SB rubber based adhesive pillows;
b) SBS rubber based adhesive pillows (as in Example 3), by bagging as in Example 1.

The unevacuated packs of adhesive a) could be melted at 150° C. and the adhesive applied without any notable effect of the plastic film material. Adhesive b) melted and applied at 120° C. again gave inhomogeneity problems unless the packs were substantially voided of air.

EXAMPLE 5

Tests according to the standard FINAT method were carried out with the adhesive a) of Example 4, with 60±2 g per m² coating on polyester RN 36. The following table shows the test results:

|  | non-packaged adhesive | packaged adhesive |
|---|---|---|
| I. Tack Free Hanging Loop N/25 mm | | |
| without ageing | 28.0 | 28.0 |
| after ageing for 12 weeks at 23° C. | 22.5 | 26.5 |
| after ageing for 12 weeks at 50° C. | 23.0 | 23.7 |
| II. 180° peel adhesion resistance N/25 mm | | |
| without ageing | 25.2 | 25.0 |
| after ageing for 12 weeks at 23° C. | 20.2 | 20.6 |
| after ageing for 12 weeks at 50° C. | 20.6 | 19.6 |

These test results show that the adhesive properties of the samples were unaffected by the admixture of the packaging material.

We claim:

1. A method of packaging a thermoplastic or thermosetting hot melt adhesive, said method comprising the steps of:
   a) providing one substantially uniform separate portion of an adhesive composition;
   b) sufficiently solidifying said portion for packaging;
   c) selecting a plastic packaging material having a softening point below about 120° C., and having physical characteristics which are compatible with and do not substantially adversely affect the adhesive characteristics of a molten mixture of said adhesive and said material and whereby said mixture is substantially compatible with the operation of hot melt application equipment;
   d) substantially completely surrounding said sufficiently solidified adhesive portion with said plastic packaging material.

2. The method according to claim 1, further comprising, before step b), as a step a) coating the adhesive with a separating, anti-stick substance and pre-cooling the adhesive composition.

3. The method according to claim 1, wherein the packaging material is a wrap, a sack or a bag made of a plastic film or a net or a similar apertured enclosure made of plastic, preferably weighing between 0.1 and 3% by weight with respect to the weight of the adhesive composition contained in the package.

4. The method according to claim 3, wherein the packaging material is a sack or bag sealed by welding after filling with the adhesive composition.

5. A method of packaging a thermoplastic or thermosetting hot melt adhesive, said method comprising the steps of:
   a) providing a plurality of substantially uniform separate portions of an adhesive composition;
   b) sufficiently solidifying all said portions for packaging;
   c) forming a batch comprising the plurality of solidified portions,
   d) selecting a plastic packaging material having a softening point below about 120° C. and having physical characteristics which are compatible with and do not substantially adversely affect the adhesive characteristics of a molten mixture of said adhesive and said material and whereby said mixture is substantially compatible with the operation of hot melt application equipment;
   e) substantially completely surrounding said batch with said plastic packaging material.

6. The method according to claim 5, further comprising, before step b), as a step a) coating the adhesive with a separating, anti-stick substance and pre-cooling the adhesive composition.

7. The method according to claim 5, wherein the packaging material is a sack or bag made of plastic film or a net or similar apertured enclosure made of plastic, preferably weighing between 0.1 and 3% by weight with respect to the weight of the adhesive composition contained in the package.

8. The method according to claim 5, the portions being provided by separating a continuous mass of adhesive composition into roughly pillow-shaped pieces weighing between 0.1 and 50 grams.

9. The method according to claim 8, the adhesive composition having a high softening point above about 120° C. and the packaging being a sack of plastic film material or a net or similar apertured enclosure made of plastic.

10. The method according to claim 8, the adhesive composition having a low softening point between about 50° C. and 105° C., and the packaging being a bag of plastic film material, said bag being sealed by welding after filling with the adhesive.

11. The method according to claim 10, the bag taking a batch of about 100 to 4000 grams of pillow-shaped adhesive composition portion pieces.

12. The method according to claim 10, the plastics film packaging material having a softening point substantially corresponding to the softening point of the adhesive composition.

13. The method according to claim 10, the plastics film material having a thickness in the range between about 5 μm and 200 μm.

14. The method according to claim 9, the plastic material being selected from the group consisting of ethylene based polymers, including ethylene/vinyl acetate, ethylene acrylate, ethylene methacrylate, ethylene methyl acrylate, ethylene methyl methacrylate, high and low density polyethylene, polyethylene blends and chemically modified polyethylene, copolymers of ethylene and 1–6 mono- or di-unsaturated monomers, polyamides, polybutadiene rubber, polyesters such as polyethylene terephthlate, polybutylene terephthalate; thermoplastic polycarbonates, atactic poly-alphaolefins, including atactic polypropylene, and others; thermoplastic polyacrylamides, polyacrylonitrile, copolymers of acrylonitrile and other monomers such as butadiene styrene; polymethyl pentene, polyphenylene sulfide, aromatic polyurethanes; styrene-acrylonitrile, acrylonitrile-butadiene-styrene, styrene-butadiene rubbers, polyethylene terephthalate, acrylonitrile-butadiene-styrene elastomers, polyphenylene sulfide, A—B, A—B—A, A—(B—A)$_n$—B, (A—B)$_n$—Y block polymers wherein the A comprises a polyvinyl aromatic block, the B block comprises a rubbery midblock which can be partly hydrogenated, and mixtures of said substances.

15. The method according to claim 9, the adhesive composition portion pieces being cooled to ambient or below ambient in a cooling bath at least on their outsides and thereafter conveyed to a netting or bagging station for packaging.

16. The method according to claim 10, the bag filled with the adhesive composition portion pieces being weld-sealed.

17. The method according to claim 10, at least most of the air remaining in the bag after filling being removed, bringing the packaging film material into close contact with the adjoining adhesive composition pieces.

18. The method according to claim 17, the filled and sealed bag being compressed or evacuated, and air being forced out from around and between the portion pieces and out of the bag through pores, punctures and perforations in the film material and/or through openings in the weld seam, the batch of adhesive composition pieces being compacted and the packaging film material being adhered to the surfaces of the compacted batch.

19. The method according to claim 18, the adhesive in the bag being sufficiently re-heated before compression or allowed to retain sufficient internal heat in the cooling step to facilitate deformation of the packaged adhesive composition portion pieces during compression.

20. The method according to claim 18, the compression being provided by means of a press.

21. The method according to claim 18, the compression being provided by the weight of the stacked filled bags under the influence of elevated ambient temperature, especially through stacking the bags in delivery boxes, crates, cartons and such like, and storing same in a sufficiently heated room.

22. The method according to claim 18, the compression being carried out at an elevated temperature of 30° C. to 150° C.

23. A method of packaging a thermoplastic or thermosetting hot melt adhesive, said method comprising the steps of:
   a) providing an adhesive composition in flowable form, sufficiently plastified for packaging;
   b) inserting at least one portion of said flowable, plastified adhesive composition into a plastics packaging material enclosure;
   c) selecting a plastic packaging material having a softening point below about 120° C. and having physical characteristics which are compatible with and do not substantially adversely affect the adhesive characteristics of a molten mixture of said adhesive and said material and whereby said mixture is substantially compatible with the operation of hot melt application equipment; and
   d) separating and substantially completely surrounding said at least one portion with said plastics packaging material.

24. The method according to claim 23, further comprising, before step b), as a step a) coating the adhesive with a separate, anti-stick substance and pre-cooling the adhesive to a flowable, plastified state, of the adhesive composition.

25. The method according to claim 23, wherein the packaging material enclosure is a sack or a bag made of plastic film or a net or a similar apertured enclosure made of plastic, preferably weighing between 0.1 and 3% by weight with respect to the weight of the adhesive composition contained in the package.

26. The method according to claim 25, wherein the packaging material enclosure is a sack or bag sealed by welding after filling with the adhesive composition.

27. The method according to claim 23, wherein the flowable, plastified composition has a softening point temperature of between about 50° C. and 100° C.

28. The method according to claim 23, wherein the flowable, plastified composition is provided by means of a melt extruder having cooling means for adjusting the temperature of the extrudate.

29. The method according to claim 1, the plastic packaging material having a melting or softening point of below about 125° C.

30. The method of claim 8 wherein the softening point of the adhesive is below 120° C.

31. The method of claim 8 wherein the softening point of the adhesive is about 80° C.

32. The method of claim 8 wherein the batch is about 250 to 1000 grams.

33. The method of claim 10 wherein the film thickness is 15 μm to 50 μm.

34. The method of claim 1 wherein the packaging material has a softening point of about 90° C. to 120° C.

35. A method of packaging a synthetic block polymer based hot melt method, said adhesive comprising the steps of:

(a) providing one substantially uniform separate portion of an adhesive composition comprising a synthetic block polymer based hot-melt adhesive;

(b) sufficiently solidifying said portion for packaging;

(c) selecting a polyethylene packaging material which is meltable together with the adhesive composition and blendable into the adhesive composition in a molten state, said packaging material being chosen so as to not disadvantageously effect the properties of the adhesive composition when blended into same, and to be substantially compatible with the operation of hot melt application equipment; and (d) substantially completely surrounding said sufficiently solidified portion with said polyethylene packaging material.

36. The method according to claim 35 wherein said film material has a thickness in the range between about 5 μm and 50 μm.

37. The method according to claim 35 wherein said film material has a softening point below about 120° C.

38. The method of claim 1 comprising the additional step of applying said molten mixture through hot melt application equipment having an orifice less than about 0.025 inches in diameter.

39. The method of claim 5 comprising the additional step of applying said molten mixture through hot melt application equipment having an orifice less than about 0.025 inches in diameter.

40. The method of claim 23 comprising the additional step of applying said molten mixture through hot melt application equipment having an orifice less than about 0.025 inches in diameter.

* * * * *

UNITED STATES PATENT AND TRADEMARK OFFICE
CERTIFICATE OF CORRECTION

PATENT NO. : 5,257,491

DATED : November 2, 1993

INVENTOR(S) : Rouyer, et. al.

Page 1 of 3

It is certified that error appears in the above-indentified patent and that said Letters Patent is hereby corrected as shown below:

Title page, item [30], insert --PCT-EP90/01267 filed 8-10-90--.

In column 4, line 68, please delete "polyphenlene" and insert --polyphenylene--.

In column 5, line 15, please delete "vinylacetate copolymer, with a vinylacetate" and insert --vinyl acetate copolymer, with a vinyl acetate--.

In column 14, lines 13 and 14, please delete "vinylacetae copolymer with 17% vinylacetate" and insert --vinyl acetate copolymer with 17% vinyl acetate--.

In column 8, line 15, please insert --"-- before and after the title "The.....Resins".

In column 9, line 68, please delete "bezoic" and insert --benzoic--.

In column 11, line 30, please delete "polythylene" and insert --polyethylene--.

In column 12, line 12, please delete "vapour" and insert --vapor--.

UNITED STATES PATENT AND TRADEMARK OFFICE
CERTIFICATE OF CORRECTION

Page 2 of 3

PATENT NO. : 5,257,491
DATED : November 2, 1993
INVENTOR(S) : Rouyer, et. al.

It is certified that error appears in the above-indentified patent and that said Letters Patent is hereby corrected as shown below:

In column 14, line 25 twice, please delete "adhesive" and insert --Adhesive--.

In column 14, line 52 twice, please delete "adhesive" and insert --Adhesive--.

In column 15, lines 52 and 53, on wrong lines should be on lines 55 and 56, also should be on lines 52 and 53.

In column 15, lines 52 and 53, please delete "non-packaged adhesive" and insert --Non-Packaged Adhesive--.

In column 15, lines 52 and 53, please delete "packaged adhesive" and insert --Packaged Adhesive--.

In column 15, line 63, please insert --Non-Packaged Adhesive-- and --Packaged Adhesives-- after the words "N25/mm".

In column 17, line 30, please delete "terephthlate" and insert --terephthalate--.

In column 19, line 2, please delete "method" and insert --adhesive--.

UNITED STATES PATENT AND TRADEMARK OFFICE
CERTIFICATE OF CORRECTION

PATENT NO. : 5,257,491
DATED : November 2, 1993
INVENTOR(S) : Rouyer, et. al.

It is certified that error appears in the above-indentified patent and that said Letters Patent is hereby corrected as shown below:

In Column 19, line 2, delete "adhesive comprising" and insert--method comprising Signed and Sealed this Ninth Day of August, 1994

Attest:

BRUCE LEHMAN

*Attesting Officer*  *Commissioner of Patents and Trademarks*